(12) United States Patent
Park et al.

(10) Patent No.: US 10,509,111 B2
(45) Date of Patent: Dec. 17, 2019

(54) LIDAR SENSOR DEVICE

(71) Applicant: RESEARCH COOPERATION FOUNDATION OF YEUNGNAM UNIVERSITY, Gyeongsangbuk-do (KR)

(72) Inventors: Yongwan Park, Daegu (KR); Gunzung Kim, Gyeongsangbuk-do (KR)

(73) Assignee: RESEARCH COOPERATION FOUNDATION OF YEUNGNAM UNIVERSITY, Gyeongsangbuk-Do (KR)

( * ) Notice: Subject to any disclaimer, the term of this patent is extended or adjusted under 35 U.S.C. 154(b) by 316 days.

(21) Appl. No.: 15/311,985

(22) PCT Filed: Nov. 27, 2015

(86) PCT No.: PCT/KR2015/012825
§ 371 (c)(1),
(2) Date: Nov. 17, 2016

(87) PCT Pub. No.: WO2017/051986
PCT Pub. Date: Mar. 30, 2017

(65) Prior Publication Data
US 2018/0180715 A1    Jun. 28, 2018

(30) Foreign Application Priority Data

Sep. 25, 2015    (KR) .................. 10-2015-0136948

(51) Int. Cl.
*G01S 7/00*    (2006.01)
*G01S 7/484*    (2006.01)
*G01S 17/93*    (2006.01)

(52) U.S. Cl.
CPC ............ *G01S 7/484* (2013.01); *G01S 7/4861* (2013.01); *G01S 7/4865* (2013.01); *G01S 17/936* (2013.01)

(58) Field of Classification Search
None
See application file for complete search history.

(56) References Cited

U.S. PATENT DOCUMENTS

2005/0195383 A1*  9/2005  Breed ................... B60N 2/002
                                                          356/4.01
2007/0103699 A1*  5/2007  Kohnen ................ G01B 11/14
                                                          356/620
(Continued)

FOREIGN PATENT DOCUMENTS

JP    3240835 B2    12/2001
JP    4243803 B2    3/2009
(Continued)

OTHER PUBLICATIONS

Notice of Allowance dated Aug. 21, 2017 from Korean Patent Office in a counterpart Korean Patent Application No. 10-2015-0136948 (all the cited references are listed in this IDS.).

*Primary Examiner* — Hovhannes Baghdasaryan
(74) *Attorney, Agent, or Firm* — The PL Law Group, PLLC

(57) ABSTRACT

A light detection and ranging (LIDAR) sensor device includes a transmitter that transmits a laser beam including laser beam identification information corresponding to each transmission direction while changing a transmission direction, a receiver that receives a reflected beam returning after the laser beam is reflected by an object, and a signal processor that identifies a transmission direction of a laser (Continued)

beam corresponding to the reflected beam based on laser beam identification information included in the received reflected beam.

10 Claims, 2 Drawing Sheets

(56) References Cited

U.S. PATENT DOCUMENTS

| | | | | |
|---|---|---|---|---|
| 2007/0211786 A1* | 9/2007 | Shattil | ............ | H04B 1/707 375/141 |
| 2011/0249251 A1* | 10/2011 | Lynch | ............ | G01C 21/32 356/5.01 |
| 2011/0279366 A1* | 11/2011 | Lohbihler | ............ | G01S 5/0247 345/157 |

FOREIGN PATENT DOCUMENTS

| | | |
|---|---|---|
| KR | 10-1996-0002109 A | 1/1996 |
| KR | 10-2011-0002294 A | 1/2011 |
| KR | 10-2014-0136647 A | 12/2014 |
| KR | 10-2015-0009177 A | 1/2015 |
| KR | 10-2015-0052469 A | 5/2015 |

\* cited by examiner

LIDAR SENSOR DEVICE

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2015/012825, filed Nov. 27, 2015, which claims priority to the benefit of Korean Patent Application No. 10-2015-0136948 filed in the Korean Intellectual Property Office on Sep. 25, 2015, the entire contents of which are incorporated herein by reference.

TECHNICAL FIELD

Embodiments of the present disclosure relate to a light detection and ranging (LIDAR) sensor.

BACKGROUND ART

After Stanley with a LIDAR mounted thereon won the DARPA Grand Challenge 2005, a LIDAR is being essentially mounted on an autonomous vehicle to generate a map of a drivable space.

To improve safety of a vehicle, functions being adopted nowadays recognize a driving condition by combining functions of different sensors around a camera for image acquisition and a LIDAR or radar for distance measurement.

However, mutual interference occurs when a plurality of conventional radars and LIDARs simultaneously operate, and a case in which an object that is present is not recognized and determined as not being present or an object that is not present is recognized and determined as being present may occur.

In addition, a conventional LIDAR transmits a laser pulse, waits for a predetermined amount of time to receive a signal returning after reaching an object, and rotates by a predetermined angle. That is, since the conventional LIDAR always waits for a set amount of time with respect to all measurable regions and then rotates by a predetermined angle to transmit a laser pulse, a measurement time is required proportional to a product of latency and angular resolution.

SUMMARY

Embodiments of the present disclosure are directed to providing a light detection and ranging (LIDAR) sensor device.

According to an embodiment of the present disclosure, a LIDAR sensor device includes a transmitter that transmits a laser beam including laser beam identification information corresponding to each transmission direction while changing a transmission direction, a receiver that receives a reflected beam returning after the laser beam is reflected by an object, and a signal processor that identifies a transmission direction of a laser beam corresponding to the reflected beam based on laser beam identification information included in the received reflected beam.

The transmitter may transmit the laser beam while changing the transmission direction regardless of whether a reflected beam of an already transmitted laser beam is received.

The laser beam may further include a preamble formed of one or more pulses, and the signal processor may measure one or more of a distance to the object, a speed of the object, an intensity of the reflected beam, and a width of the reflected beam based on a preamble included in the reflected beam.

The signal processor may measure the distance to the object based on a reception time of a first pulse of the preamble included in the reflected beam and a transmission time of a first pulse of a preamble included in a laser beam corresponding to the reflected beam.

The signal processor may measure the intensity and the width of the reflected beam based on the shape of a pulse of the preamble included in the reflected beam.

The signal processor may measure the speed of the object based on the frequency of the preamble included in the reflected beam and the frequency of the preamble included in the laser beam corresponding to the reflected beam.

The laser beam may further include device identification information, and the signal processor may identify whether a reflected beam received by the receiver is a reflected beam of a laser beam transmitted by the transmitter based on device identification information included in the reflected beam received by the receiver.

The laser beam may further include checksum information to check whether the laser beam identification information and the device identification information are corrupt, and the signal processor may use the checksum information included in the received reflected beam to determine whether laser beam identification information and device identification information included in the received reflected beam are corrupt.

According to embodiments of the present disclosure, a laser beam is transmitted using a laser beam including laser beam identification information regardless of whether a reflected beam of a transmitted laser beam is received, thereby reducing latency for distance measurement and reducing the cost and size of a light detection and ranging (LIDAR) sensor since a plurality of laser beam generators and reflected beam receivers are not required.

Furthermore, a laser beam includes device identification information so that mutual interference between devices is prevented while a distance is being measured using a plurality of LIDAR sensor devices, and accuracy of measurement can be improved.

DETAILED DESCRIPTION

Hereinafter, specific embodiments of the present disclosure will be described with reference to the drawings. The detailed description below is provided to assist in a comprehensive understanding of a method, a device, and/or a system to be described herein. However, the detailed description is merely an example, and the present disclosure is not limited thereto.

In describing the embodiments of the present disclosure, when a detailed description of a known art related to the present disclosure is deemed as possibly unnecessarily blurring the gist of the present disclosure, the detailed description thereof will be omitted. In addition, terms to be described below are those defined in consideration of functions in the present disclosure and may vary according to intentions, practices, or the like of a user or an operator. Thus, the terms should be defined based on content throughout the present specification. Terms used in the detailed description are merely for describing the embodiments of the present disclosure and should not be considered as limiting. Unless clearly used otherwise, a singular expression includes a plural meaning. In the description, expressions such as "include" and "have" are for indicating certain features, numbers, steps, operations, elements, a part or a combination thereof and should not be construed as excluding presence or possibility of one or more features, numbers, steps, operations, elements, a part or a combination thereof other than the above.

Figure 1:
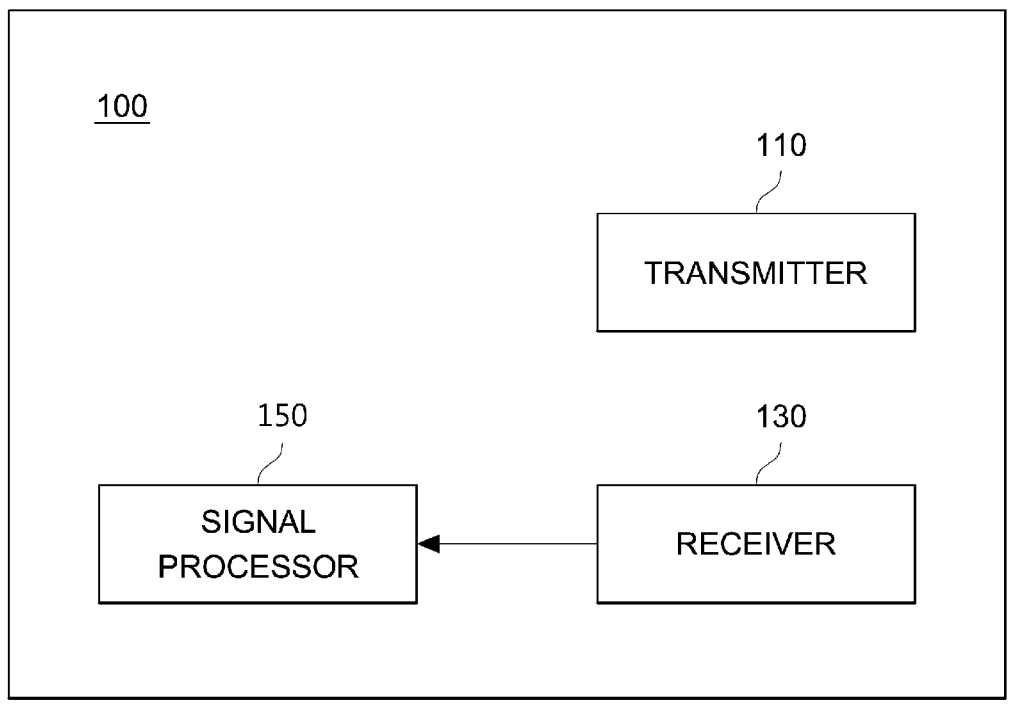
FIG. 1 is a block diagram of a LIDAR sensor device according to an embodiment of the present disclosure.

FIG. 1 is a block diagram of a LIDAR sensor device according to an embodiment of the present disclosure.

Referring to FIG. 1, a LIDAR sensor device 100 according to an embodiment of the present disclosure includes a transmitter 110, a receiver 130, and a signal processor 150.

The transmitter 110 generates a laser beam including laser beam identification information corresponding to a transmission direction and transmits the generated laser beam while changing the transmission direction. Here, the laser beam identification information is for identifying the direction from which a laser beam corresponding to each of the received reflected beams was transmitted, when laser beams transmitted in different directions return after being reflected by an object.

Specifically, the transmitter 110 may generate and transmit each laser beam in a direction corresponding to each pixel of an image that will be generated based on a distance measured by the LIDAR sensor device 100, and each of the transmitted laser beams may include laser beam identification information which is identification information related to a direction in which each of the laser beams is transmitted.

For example, when it is assumed that resolution of an image to be generated based on distances measured by the LIDAR sensor device 100 is 1280×720, the transmitter 110 may change transmission directions to correspond to pixel coordinates, ranging from (1, 1) to (1280, 720), of the image to be generated and transmit a laser beam in each of the transmission directions. Meanwhile, laser beam identification information included in each of the laser beams transmitted here may use pixel coordinates corresponding to transmission directions, transmission angles, etc. for example but is not necessarily limited thereto, and any piece of information may be utilized as the laser beam identification information so long as the piece of information may distinguish reflected beams of laser beams that have been transmitted in different directions.

Meanwhile, the receiver 130 receives a reflected beam returning after a laser beam transmitted by the transmitter 110 is reflected by an object present in a direction in which the laser beam has been transmitted.

Figure 2:
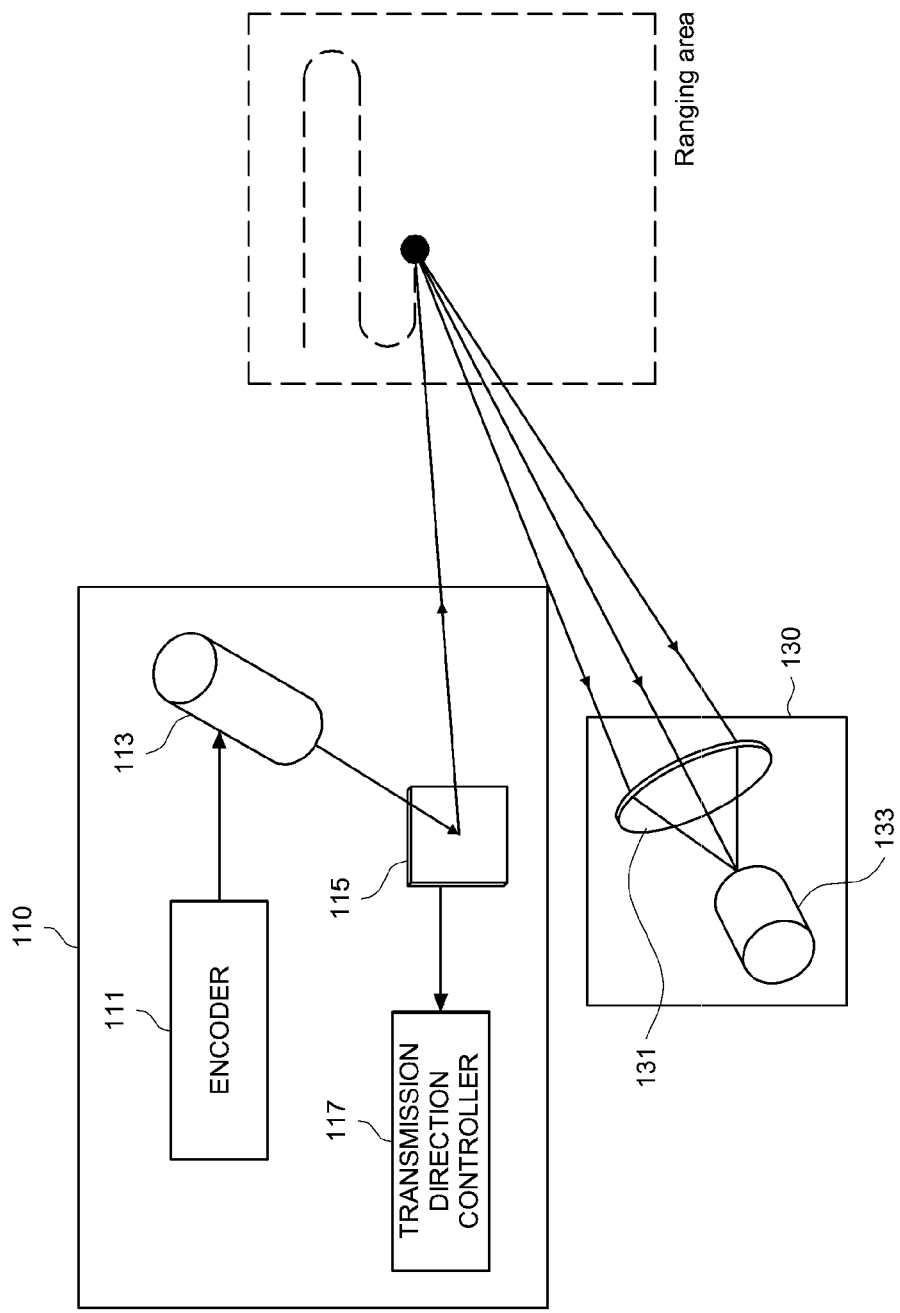
FIG. 2 is a detailed block diagram of a transmitter and a receiver according to an embodiment of the present disclosure.

Specifically, FIG. 2 is a detailed block diagram of the transmitter 110 and the receiver 130 according to an embodiment of the present disclosure.

Referring to FIG. 2, the transmitter 110 may include an encoder 111, a laser beam source 113, a reflecting mirror 115, and a transmission direction controller 117.

The encoder 111 may generate an electrical signal for generating a laser beam having a Gaussian pulse type pulse and provide the electrical signal to the laser beam source 113. Specifically, according to an embodiment of the present disclosure, the encoder 111 may generate a bit stream including laser beam identification information and generate an electrical signal by modulation and encoding of the generated bit stream. Here, for the modulation of the generated bit stream, an optical code-division multiple access (OCDMA) method may be used, for example.

The laser beam source 113 may generate a laser beam according to the electrical signal generated by the encoder 111, and the reflecting mirror 115 may reflect the laser beam generated by the laser beam source 113 to allow the laser beam to be transmitted in a particular direction.

The transmission direction controller 117 may control a reflecting angle of the reflecting mirror 115 according to laser beam identification information included in the laser beam generated by the laser beam source 113 to allow the laser beam to be transmitted in a direction corresponding to the laser beam identification information.

Meanwhile, according to an embodiment of the present disclosure, the transmitter 110 may transmit a laser beam while changing a transmission direction regardless of whether a reflected beam of the laser beam that has been transmitted in the particular direction is received.

Specifically, the encoder 111 and the laser beam source 113 may generate a laser beam including laser beam identification information, and the transmission direction controller 117 may control the reflecting angle of the reflecting mirror 115 so that the generated laser beam is reflected in a transmission direction corresponding to the laser beam identification information of the generated laser beam. Then, the encoder 111 and the laser beam source 113 may generate a laser beam including laser beam identification information different from that of laser beams transmitted earlier according to preset time intervals regardless of whether a reflected beam of a laser beam transmitted earlier is received by the receiver 130, and the transmission direction controller 117 may change the reflecting angle of the reflecting mirror 115 so that the generated laser beam is reflected in a transmission direction corresponding to the laser beam identification information of the generated laser beam.

That is, according to an embodiment of the present disclosure, since each of the laser beams transmitted by the transmitter 110 has laser beam identification information as described above, each of the reflected beams received by the receiver 130 also has the laser beam identification information. Consequently, even when reflected beams of laser beams transmitted in different directions are received, the direction from which a laser beam corresponding to each of the received reflected beams was transmitted may be identified. Accordingly, unlike a conventional LIDAR sensor, since transmitting a laser beam does not have to be delayed until a reflected beam of a pre-transmitted laser beam is received, latency for laser transmission decreases, and an amount of time required in a distance measurement decreases as a result.

Meanwhile, the receiver 130 may include a focusing lens 131 for focusing a reflected beam and a photodiode 133 that converts a received reflected beam to an electrical signal.

Referring again to FIG. 1, the signal processor 150 may identify a transmission direction of a corresponding laser beam based on laser beam identification information included in a reflected beam received by the receiver 130 and may measure a distance from an object present in the identified transmission direction based on a transmission time of the laser beam that has been transmitted in the identified transmission direction and a reception time of the received reflected beam.

Meanwhile, according to an additional embodiment of the present disclosure, each of the laser beams generated by the transmitter 110 may include a preamble formed of one or more pulses. In this case, a reflected beam received after a laser beam transmitted by the transmitter 110 is reflected by an object also includes a preamble, and the signal processor 150 may measure one or more of a distance to an object, a speed of an object, an intensity of a reflected beam, and a width of the reflected beam based on the preamble included in the reflected beam received by the receiver 130.

Specifically, the signal processor 150 may calculate a difference between a reception time of a first pulse of a preamble included in the reflected beam received by the receiver 130 and a transmission time of a first pulse of a preamble included in a laser beam corresponding to the received reflected beam. Here, the transmission time of the first pulse of the preamble included in the laser beam may be, for example, a time at which a maximum value of the first pulse is transmitted, and the reception time of the first pulse of the preamble included in the reflected beam may be, for example, a time at which the maximum value of the first pulse is received. Then, the signal processor 150 may use the calculated time difference and a speed of light to calculate the distance to an object.

Meanwhile, the signal processor 150 may measure the intensity and the width of the reflected beam based on the shape of a pulse included in the reflected beam received by the receiver 130.

Specifically, the signal processor 150 may, for example, calculate the maximum value of the first pulse of the preamble included in the reflected beam received by the receiver 130 as the intensity of the reflected beam. Here, the measured intensity of the reflected beam may be used in determining identity of objects or a feature of the objects. Specifically, when objects different from each other are spaced apart by the same distance from the LIDAR sensor device 100, the intensity of the reflected beam is greatly influenced by a surface texture, color, reflectivity, an incidence angle etc. of the objects. When the same objects are spaced apart by the same distance from the LIDAR sensor device 100, the intensity of the reflected beam is greatly influenced by distance from the LIDAR sensor device 100. Consequently, features of objects including texture, color, reflectivity, and an incidence angle may be realized when the intensity of the reflected beam reflected from the objects and the distance to the objects are used.

Meanwhile, the signal processor 150 may, for example, measure the width of the first pulse of the preamble included in the reflected beam received by the receiver 130 to measure the width of the reflected beam. Specifically, the signal processor 150 may, for example, calculate a distance between a point where a value of a pulse is 50% of the maximum value thereof in a section in which the pulse is increasing and a point where the value of the pulse is 50% of the maximum value of thereof in a section in which the pulse is decreasing as the width of the reflected beam. Meanwhile, since the width of the reflected beam is affected by a slope of a surface of an object, the measured width of the reflected beam may be utilized to realize the slope of the surface of an object.

Meanwhile, the signal processor 150 may, for example, measure the speed of the object based on frequency of pulses of the preamble included in the reflected beam received by the receiver 130. Specifically, due to the Doppler effect, when a laser beam transmitted by the transmitter 110 returns after being reflected by a moving object, the frequency of the pulses of the preamble changes. Consequently, the signal processor 150 may measure the frequency of the pulses of the preamble included in the reflected beam received by the receiver 130 and may measure the speed of the object from differences between the measured frequency and frequency of pulses of a preamble of the laser beam transmitted by the transmitter 110.

Meanwhile, according to an additional embodiment of the present disclosure, the laser beam transmitted by the transmitter 110 may further include device identification information, and the signal processor 150 may identify whether the received reflected beam is a reflected beam of the laser beam transmitted by the transmitter 110 based on device identification information included in the reflected beam received by the receiver 130. Here, any form of information may be used as the device identification information so long as the piece of information may identify the LIDAR sensor device 100.

Specifically, when a plurality of LIDAR sensor devices are simultaneously used for distance measurement, since each of the LIDAR sensor devices cannot recognize whether a received reflected beam is a reflected beam of a laser beam transmitted by itself or is a reflected beam of a laser beam transmitted by another LIDAR sensor device, mutual interference occurs between the LIDAR sensor devices, and the interference ultimately lowers accuracy of measurement by the LIDAR sensor devices. On the other hand, according to an embodiment of the present disclosure, even when a plurality of LIDAR sensor devices are simultaneously used, each of the LIDAR sensor devices only use a reflected beam of a laser beam transmitted by itself for distance measurement and the like based on device identification information included in a received reflected beam, thereby preventing mutual interference between the LIDAR sensor devices.

Meanwhile, according to an additional embodiment of the present disclosure, a laser beam transmitted by the transmitter 110 may further include checksum information for determining whether laser beam identification information or device identification information included in the laser beam is corrupt. In this case, since a reflected beam of the laser beam also includes checksum information, the signal processor 150 may use the checksum information included in the reflected beam to determine whether the laser beam identification information or the device identification information is corrupt and may only use a reflected beam whose laser beam identification information or device identification information is not corrupt for distance measurement, and the like, thereby improving accuracy of measurement.

Meanwhile, an embodiment of the present disclosure may include a computer-readable recording medium that includes a program for executing the methods described herein on a computer. The computer-readable recording medium may include a program command, a local data file, a local data structure, etc. solely or in combinations. The medium may be that particularly designed and configured for the present disclosure or may be that generally usable in the computer software field. Examples of the computer-readable recording medium include hardware devices particularly configured to store and execute a program command, the hardware devices including magnetic media such as a hard disk, a floppy disk, and a magnetic tape, optical recording media such as a compact disk read-only memory (CD-ROM) and a digital versatile disk (DVD), magnetic-optical media such as a floppy disk, and memories such as a ROM, a random access memory (RAM), and a flash memory. Examples of the program command may include a machine language code created by a compiler as well as a high-level language code that may be executed by a computer using an interpreter and the like.

Although exemplary embodiments of the present disclosure have been described above in detail, those of ordinary skill in the art to which the present disclosure pertains should understand that various modifications may be made to the embodiments described above within a range not departing from the scope of the present disclosure. Thus, the scope of the present disclosure should not be limitingly defined by the embodiments described herein and should be defined by the claims below as well as those equivalent to the claims.

The invention claimed is:

1. A light detection and ranging (LIDAR) sensor device comprising:
a transmitter configured to transmit a laser beam including laser beam identification information and a preamble formed of one or more pulses, the laser beam identification information corresponding to each transmission direction while changing a transmission direction;
a receiver configured to receive a reflected beam returning after the laser beam is reflected by an object; and
a signal processor configured to identify a transmission direction of a laser beam corresponding to the reflected beam based on laser beam identification information included in the received reflected beam, the signal processor measuring a speed of the object based on a frequency of a preamble included in the reflected beam and a frequency of the preamble included in the laser beam corresponding to the reflected beam.

2. The LIDAR sensor device of claim 1, wherein the transmitter transmits the laser beam while changing the transmission direction regardless of whether a reflected beam of an already transmitted laser beam is received.

3. The LIDAR sensor device of claim 1, wherein the signal processor further measures one or more of a distance to the object, an intensity of the reflected beam, and a width of the reflected beam based on the preamble included in the reflected beam.

4. The LIDAR sensor device of claim 3, wherein the signal processor measures the distance to the object based on a reception time of a first pulse of the preamble included in the reflected beam and a transmission time of a first pulse of a preamble included in a laser beam corresponding to the reflected beam.

5. The LIDAR sensor device of claim 3, wherein the signal processor measures the intensity and the width of the reflected beam based on a shape of a pulse of the preamble included in the reflected beam.

6. The LIDAR sensor device of claim 1, wherein:
the laser beam further includes device identification information; and
the signal processor identifies whether a reflected beam received by the receiver is a reflected beam of a laser beam transmitted by the transmitter based on device identification information included in the reflected beam received by the receiver.

7. The LIDAR sensor device of claim 6, wherein:
the laser beam further includes checksum information to check whether the laser beam identification information and the device identification information are corrupt; and
the signal processor uses the checksum information included in the received reflected beam to determine whether laser beam identification information and device identification information included in the received reflected beam are corrupt.

8. The LIDAR sensor device of claim 1, wherein the signal processor further measures an intensity of the reflected beam.

9. The LIDAR sensor device of claim 1, wherein the signal processor further measures a width of the reflected beam based on the preamble included in the reflected beam.

10. The LIDAR sensor device of claim 1, wherein the signal processor further measures an intensity of the reflected beam and a width of the reflected beam based on the preamble included in the reflected beam.

* * * * *